US012656117B2

(12) United States Patent (10) Patent No.: US 12,656,117 B2
Omura (45) Date of Patent: Jun. 16, 2026

(54) ELECTRONIC DEVICE, CALIBRATION METHOD AND PROGRAM

(71) Applicant: CASIO COMPUTER CO., LTD., Tokyo (JP)

(72) Inventor: Tatsuyoshi Omura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 276 days.

(21) Appl. No.: 18/237,947

(22) Filed: Aug. 25, 2023

(65) Prior Publication Data

US 2024/0102802 A1 Mar. 28, 2024

(30) Foreign Application Priority Data

Sep. 22, 2022 (JP) ................................. 2022-151494

(51) Int. Cl.
  *G01C 17/38* (2006.01)
  *G01C 17/28* (2006.01)
(52) U.S. Cl.
  CPC ............. *G01C 17/38* (2013.01); *G01C 17/28* (2013.01)
(58) Field of Classification Search
  CPC ................................. G01C 17/28; G01C 17/38
  USPC ......................................................... 33/356
  See application file for complete search history.

(56) References Cited

U.S. PATENT DOCUMENTS 6,957,088 B2 * 10/2005 Kato ....................... A63F 13/57
                                                        455/457
7,814,671 B2 * 10/2010 Okeya .................. G09B 29/008
                                                        33/355 R 9,341,475 B2 * 5/2016 Handa .................... G01C 17/38
9,366,533 B2 * 6/2016 Ashida ................... G01C 17/38
9,645,202 B2 * 5/2017 Choi ...................... G01R 33/04
10,408,616 B2 * 9/2019 Lee ........................ G01C 25/00
11,287,259 B2 * 3/2022 Vissiere ................. G01C 17/38
11,340,071 B2 * 5/2022 Sakano ................ G05D 1/0214
2011/0105957 A1 * 5/2011 Kourogi ................. G01C 22/00
                                                        600/595
2017/0350721 A1 * 12/2017 Ren ...................... A01B 69/008
2020/0300929 A1 9/2020 Omura et al.
2023/0049448 A1 * 2/2023 Yong ...................... G01C 17/38
2023/0049947 A1 * 2/2023 Kim ....................... G04G 99/00

(Continued)

FOREIGN PATENT DOCUMENTS

JP          2006271715 A      10/2006
JP          2016057183 A       4/2016

(Continued)

*Primary Examiner* — George B Bennett
(74) *Attorney, Agent, or Firm* — Holtz, Holtz & Volek PC

(57) ABSTRACT

The present disclosure provides an electronic device, a calibration method, and a program, which can suppress the power consumed by calibration of a geomagnetic sensor while maintaining high convenience. The electronic device operable in a plurality of types of usage modes including an activity mode associated with a predetermined activity, includes: a geomagnetic sensor that detects geomagnetic data; one or more processors; and one or more memories storing a program to be executed by the one or more processors. The program causes the one or more processors to perform the following: starting calibration of the geomagnetic sensor when it is determined that the electronic device is operating in the usage mode of the activity mode associated with the predetermined activity.

22 Claims, 5 Drawing Sheets

(56)                    References Cited

U.S. PATENT DOCUMENTS

2024/0077944  A1*    3/2024   Yokoyama ............... G06F 3/011
2025/0180674  A1*    6/2025   Kim ................... G01R 33/0385

FOREIGN PATENT DOCUMENTS

JP          2019113526  A     7/2019
JP          2020153805  A     9/2020

* cited by examiner

1

1

ELECTRONIC DEVICE

| 10 | 11 | 12 |
|---|---|---|
| PROCESSOR | ROM | RAM |

14

13

INPUT/OUTPUT INTERFACE

| INPUT UNIT | OUTPUT UNIT | COMMUNIC ATION UNIT | STORAGE UNIT | BATTERY | GNSS UNIT | SENSOR UNIT |
|---|---|---|---|---|---|---|
| 15 | 16 | 17 | 18 | 19 | 20 | 21 |

211
GEOMAGNETIC SENSOR

212
GYRO SENSOR

213
TEMPERATURE SENSOR

214
PRESSURE SENSOR

| IS DIRECTION DISPLAYED? | IS GEOMAGNETIC DATA USED OTHER THAN FOR DISPLAYING DIRECTION? | IS CALIBRATION EXECUTED? |
|---|---|---|
| YES | YES | YES |
| YES | YES | YES |
| YES | YES | YES |
| YES | YES | YES |
| YES | NO | YES |
| NO | YES/NO | YES/NO |
| NO | NO | NO |

T2

|  | USAGE MODE | IS CALIBRATION EXECUTED? |
|---|---|---|
| BASIC CLOCK MODE | BASIC CLOCK | NO |
|  | PRESSURE MEASUREMENT | NO |
|  | ALTITUDE MEASUREMENT | NO |
|  | TEMPERATURE MEASUREMENT | NO |
|  | DIRECTION MEASUREMENT | YES |

FIG. 7

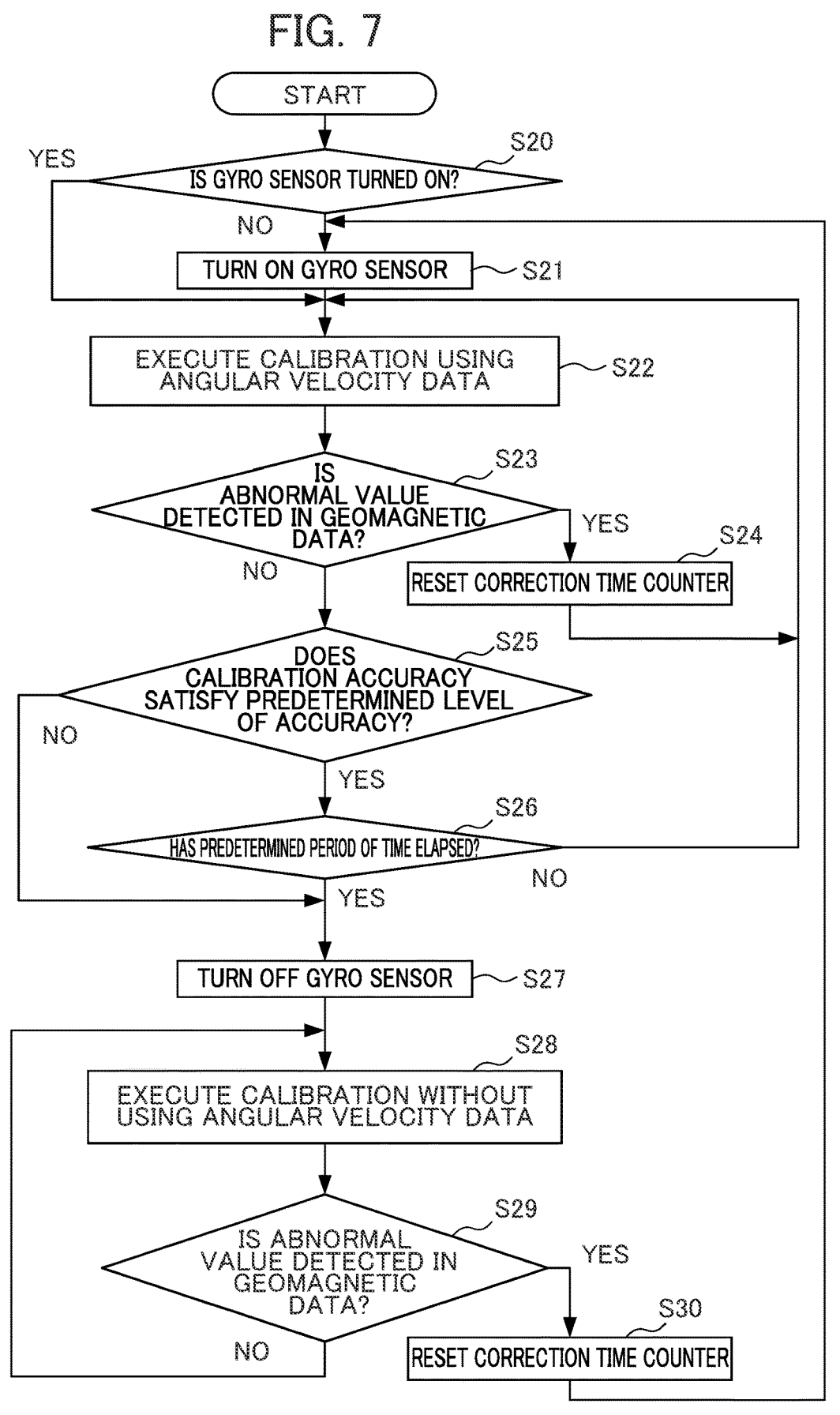

START

YES

IS GYRO SENSOR TURNED ON?    S20

NO

TURN ON GYRO SENSOR    S21

EXECUTE CALIBRATION USING ANGULAR VELOCITY DATA    S22

IS ABNORMAL VALUE DETECTED IN GEOMAGNETIC DATA?    S23

YES

NO

RESET CORRECTION TIME COUNTER    S24

DOES CALIBRATION ACCURACY SATISFY PREDETERMINED LEVEL OF ACCURACY?    S25

NO

YES

HAS PREDETERMINED PERIOD OF TIME ELAPSED?    S26

NO

YES

TURN OFF GYRO SENSOR    S27

EXECUTE CALIBRATION WITHOUT USING ANGULAR VELOCITY DATA    S28

IS ABNORMAL VALUE DETECTED IN GEOMAGNETIC DATA?    S29

YES

NO

RESET CORRECTION TIME COUNTER    S30

FIG. 8

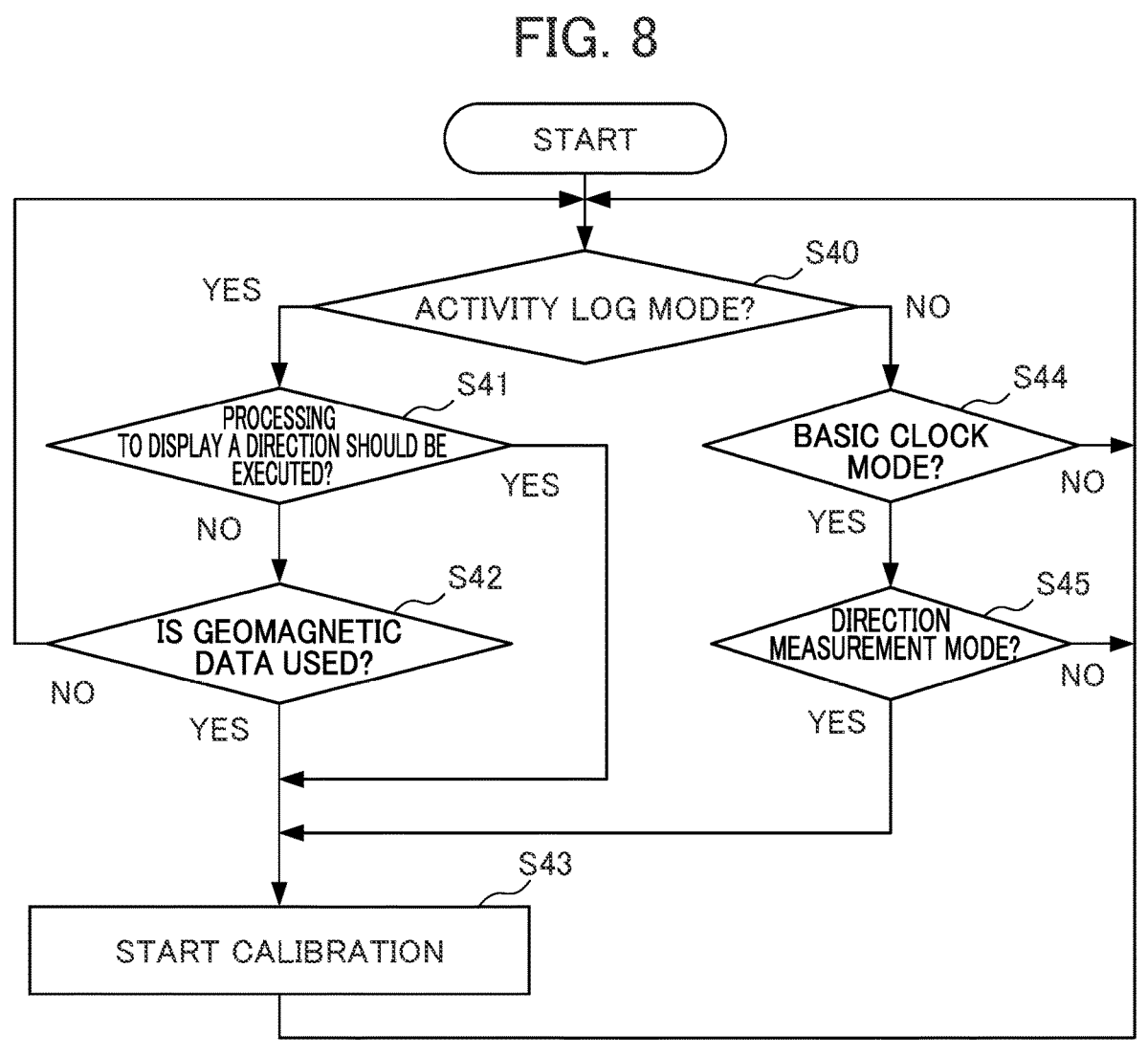

```
                              ┌──────────┐
                              │  START   │
                              └──────────┘
                                    │
                                    ▼
                                                    S40
              YES        ╱◇───────────────────◇╲      NO
         ┌────────────── ◇  ACTIVITY LOG MODE?  ◇ ──────────────┐
         │               ╲◇───────────────────◇╱                │
         ▼                                                       ▼
                                        S41                              S44
    ╱◇─────────────────◇╲                          ╱◇──────────────◇╲
    ◇     PROCESSING      ◇                         ◇  BASIC CLOCK    ◇      NO
    ◇ TO DISPLAY A DIRECTION SHOULD BE ◇            ◇     MODE?       ◇ ───────►
    ◇      EXECUTED?      ◇                          ╲◇──────────────◇╱
     ╲◇─────────────────◇╱          YES                    │
         │   NO                      │                     │ YES
         ▼                           │                     ▼
                        S42          │                              S45
    ╱◇─────────────◇╲                │               ╱◇──────────────◇╲
    ◇ IS GEOMAGNETIC ◇               │               ◇   DIRECTION     ◇     NO
    ◇  DATA USED?    ◇               │               ◇ MEASUREMENT MODE? ◇ ───►
     ╲◇─────────────◇╱               │                ╲◇──────────────◇╱
   NO    │                           │                     │
         │ YES                       │                     │ YES
         ▼◄──────────────────────────┘                     │
         │◄─────────────────────────────────────────────── ┘
         ▼
                              S43
    ┌──────────────────────────┐
    │     START CALIBRATION     │
    └──────────────────────────┘
```

ELECTRONIC DEVICE, CALIBRATION METHOD AND PROGRAM

This application is based on and claims the benefit of priority from Japanese Patent Application No. 2022-151494, filed on 22 Sep. 2022, the content of which is incorporated herein by reference.

BACKGROUND OF THE INVENTION

Field of the Invention

This disclosure relates to an electronic device, a calibration method, and a program.

Description of the Related Art

In the cases of electronic devices that measure directions using geomagnetic sensors, the geomagnetic sensors needs to be calibrated in order to correct for the changes in the magnetic field environment. For instance, Japanese Unexamined Patent Application, Publication No. 2020-153805 discloses a technique for calibrating such a geomagnetic sensor, in which a wearable device activates and calibrates a magnetic sensor under conditions such as the time elapsed from previous calibration, the duration of walking motion, and the usage mode being set in a time mode.

SUMMARY OF THE INVENTION

An aspect of the present disclosure provides an electronic device operable in a plurality of types of usage modes including an activity mode associated with a predetermined activity, includes: a geomagnetic sensor that detects geomagnetic data; one or more processors; and one or more memories storing a program to be executed by the one or more processors. The program causes the one or more processors to perform the following: starting calibration of the geomagnetic sensor when it is determined that the electronic device is operating in the usage mode of the activity mode associated with the predetermined activity.

Further features of the present invention will become apparent from the following description of exemplary embodiments (with reference to the attached drawings).

BRIEF DESCRIPTION OF THE DRAWINGS

FIG. 7 is a flowchart illustrating an example of calibration executed after making a determination to execute calibration, which is part of the calibration control processing executed by the processing unit of the electronic device according to an embodiment of the present disclosure; and FIG. 8 is a flowchart illustrating an example of processing to determine whether calibration should be executed, which is part of the calibration control processing executed by the processing unit of the electronic device according to another embodiment of the present disclosure.

DESCRIPTION OF THE EMBODIMENTS

Hereinafter, embodiments of the present disclosure will be described with reference to the drawings.

First Embodiment

Figures 1, 2:
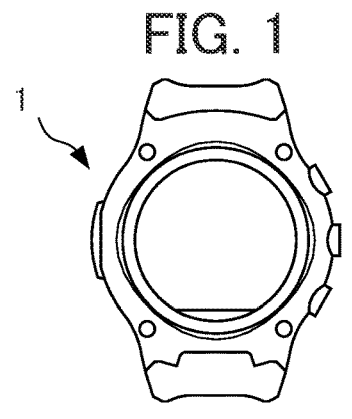
FIG. 1 is a schematic view illustrating an example of the appearance of an electronic device according to an embodiment of the present disclosure.
FIG. 2 is a block diagram illustrating an example of the hardware configuration of the electronic device according to an embodiment of the present disclosure.

First of all, description will be provided on an electronic device 1 according to a first embodiment of the present disclosure. FIG. 1 is a schematic diagram illustrating the appearance of the electronic device 1 according to the first embodiment of the present disclosure.

The electronic device 1 is an information processing device, that includes a geomagnetic sensor 211 to be described later, and executes calibration to correct for the offsets caused by influences from the surrounding magnetic fields. The electronic device 1 may be a wristwatch-type wearable terminal such as a smartwatch that can be worn on the user's wrist, or a mobile terminal that can be carried by the user, such as a smartphone or a tablet. The electronic device 1 of the present embodiment, as illustrated in FIG. 1, is a wristwatch-type wearable terminal.

Next, the hardware configuration of the electronic device 1 will be described. FIG. 2 is a block diagram illustrating an example of the hardware configuration of the electronic device 1. As illustrated in FIG. 2, the electronic device 1 includes a processor 10, a ROM (Read Only Memory) 11, a RAM (Random Access Memory) 12, a bus 13, an input/output interface 14, an input unit 15, an output unit 16, a communication unit 17, a storage unit 18, a battery 19, a GNSS unit 20, and a sensor unit 21.

The processor 10 serves as the brain of a computer and executes various calculations, processing and controls necessary to operate the electronic device 1. The processor 10 may be a CPU (Central Processing Unit), MPU (Micro Processing Unit), SoC (System on a Chip), DSP (Digital Signal Processor), GPU (Graphics Processing Unit), ASIC (Application Specific Integrated Circuit), PLD (Programmable Logic Device), FPGA (Field-Programmable Gate Array), etc. Alternatively, the processor 10 may be a combination of several of these. Additionally, the processor 10 may also be a combination of these with a hardware accelerator, etc.

The processor 10 controls various parts to implement various functions of the electronic device 1, based on firmware, system software, application software, and other programs stored in the ROM 11 or the RAM 12, etc. The processor 10 executes processing as described later, based on these programs. Part or all of these programs may also be integrated into the circuit of the processor 10.

The processor 10, the ROM 11, and the RAM 12 are interconnected through the bus 13. The input/output interface 14 is also connected to the bus 13. The input/output interface 14 is connected to the input unit 15, the output unit 16, the communication unit 17, the storage unit 18, and the battery 19.

The input unit 15 is composed of various buttons, touch panels, etc., and inputs various information based on the user's instruction operations. For example, the input unit 15 is composed of buttons such as a mode change button that switches between various usage modes of the electronic device 1, as described later.

The output unit 16 is composed of a display, speaker, etc., and outputs images and sound. For example, the output unit 16 executes processing to display information such as current time and direction, on the display screen. The input unit 15 and the output unit 16 may have an integrated configuration with both display and input functions, such as a touch panel.

The communication unit 17 includes communication modules for Near Field Communication (NFC) such as Bluetooth and communication with communication networks such as mobile phone networks and the Internet. The communication unit 17 provides the function of communication with external devices such as smartphones and personal computers. The electronic device 1 can receive various programs and data from external devices and store them in the storage unit 18.

The storage unit 18 is composed of a semiconductor memory such as DRAM (Dynamic Random Access Memory), and is a device that stores various data of the electronic device 1. For example, the storage unit 18 provides a storage area for programs that implement the functions of the electronic device 1, and for data used for running these programs. The storage unit 18 stores tables listing the correspondence relationship between various usage modes and calibration to be executed in the usage modes, and stores various data detected by the sensor unit 21. The storage unit 18 may include a storage area on a predetermined server side while in a state of being connected to a network via the communication unit 17.

The battery 19 provides power to various parts of the electronic device 1. For example, the battery 19 may be composed of a secondary battery.

The GNSS unit 20 is a positioning information acquisition unit for acquiring location information. GNSS is an abbreviation for Global Navigation Satellite System, and the GNSS unit 20 uses satellite positioning systems such as GPS. The GNSS unit 20 includes an antenna, receives positioning satellite signals sent from a plurality of positioning satellites, and sends the received positioning satellite signals to the processor 10. The processor 10 determines its own location, based on the positioning satellite signals received from the GNSS unit 20.

The sensor unit 21 includes a geomagnetic sensor 211, a gyro sensor 212, a temperature sensor 213, and a pressure sensor 214. In addition to these sensors, the sensor unit 21 can appropriately include various sensors needed for the processing executed in the electronic device 1.

The geomagnetic sensor 211 is a sensor that detects geomagnetic data, indicating the magnitude and direction of the magnetic field. Specifically, the geomagnetic sensor 211 has magnetic resistance elements (MR elements), etc., and detects geomagnetic data by measuring the strength of the geomagnetic field in each of the three orthogonal axis directions. The geomagnetic sensor 211 outputs the detected geomagnetic data to the processor 10.

The gyro sensor 212 is a sensor that detects angular velocity data, indicating the angular velocity of the electronic device 1. Specifically, the gyro sensor 212 detects angular velocity data by measuring the angular velocity in each of the three orthogonal axis directions. The gyro sensor 212 outputs the detected angular velocity data to the processor 10.

The temperature sensor 213, including a thermistor or the like, is a sensor that detects temperature data, indicating the ambient temperature of the electronic device 1. The temperature sensor 213 outputs the detected temperature data to the processor 10.

The pressure sensor 214, including a piezoelectric element or the like, is a sensor that detects atmospheric pressure data, indicating the atmospheric pressure. The pressure sensor 214 outputs the detected atmospheric pressure data to the processor 10.

Next, description is provided on the various usage modes of the electronic device 1. The electronic device 1 has a plurality of usage modes set. The usage modes are primarily divided into an activity log mode that is an activity mode associated with the user's activities, and a basic clock mode as a non-activity mode that is not associated with the user's activities. The activity log mode is a usage mode, in which processing is executed in response to the user's movements during physical activities such as running and walking. The basic clock mode is a mode, in which the electronic device 1 operates regardless of the user's movements.

The basic clock mode includes a plurality of non-activity modes. In the present embodiment, the basic clock mode includes a time display mode to display the current time, a pressure measurement mode to measure an atmospheric pressure, a temperature measurement mode to measure a temperature, an altitude measurement mode to measure an altitude, and a direction measurement mode to measure a direction.

The time display mode is a non-activity mode, in which the current time is displayed on the output unit 16, and the time display mode is a normal usage mode when the electronic device 1 is used as a regular clock. Upon activation, the electronic device 1 starts operating in the time display mode that is the default usage mode.

The pressure measurement mode is a non-activity mode, in which pressure data is detected by the pressure sensor 214 and displayed on the output unit 16. In the pressure measurement mode, for example, the electronic device 1 measures and displays the pressure every minute, and returns to the time display mode after one minute.

The temperature measurement mode is a non-activity mode, in which temperature data is measured with the temperature sensor 213 and displayed on the output unit 16. In the temperature measurement mode, for example, temperature is measured and displayed every minute, and the mode returns to the time display mode after one minute.

The altitude measurement mode is a non-activity mode, in which an atmospheric pressure of the surrounding air is measured with the pressure sensor 214, the measured pressure value is converted into an altitude of the current location, and the altitude is displayed on the output unit 16. In the altitude measurement mode, for example, a pressure is measured and an altitude is displayed every minute, and the mode returns to the time display mode after one minute.

The direction measurement mode is a non-activity mode, in which geomagnetic data is detected by the geomagnetic sensor 211, and the north direction is displayed like a compass on the output unit 16. Specifically, in the direction measurement mode, the geomagnetic data is detected by the geomagnetic sensor 211, and the directional information is specified based on the geomagnetic data by the processor 10. Then, the processor 10 sends the specified directional information to the output unit 16, and the direction is displayed on the output unit 16. That is, the direction measurement mode is a mode that utilizes the geomagnetic data detected by the geomagnetic sensor 211. In the direction measurement mode, for example, a direction is measured and the north direction is displayed every second, and the mode returns to the time display mode after one minute.

The activity log mode includes a plurality of activity modes. In the present embodiment, the activity log mode includes, for example, a RUN mode, a WALK mode, a BIKE mode, a Trekking mode, a Treadmill mode, a SWIM mode, a TENNIS mode, etc.

The RUN mode is an activity mode associated with the running motion of the user. In the RUN mode, processing suitable for the user who is running while wearing the electronic device 1 is executed.

The WALK mode is an activity mode associated with the walking motion of the user. In the WALK mode, processing suitable for the user who is walking while wearing the electronic device 1 is executed.

The BIKE mode is an activity mode associated with the driving motion of the user who is riding a bicycle. In the BIKE mode, processing suitable for the user who is riding a bicycle while wearing the electronic device 1 is executed.

The Trekking mode is an activity mode associated with the trekking motion of the user. In the Trekking mode, processing suitable for the user who is trekking while wearing the electronic device 1 is executed.

The Treadmill mode is an activity mode associated with the motion of the user walking or running on a treadmill. In the Treadmill mode, processing suitable for the user who is walking or running on a treadmill at a fixed point is executed.

The SWIM mode is an activity mode associated with the swimming motion of the user. In the SWIM mode, processing suitable for a user who is swimming while wearing the electronic device 1 is executed.

The TENNIS mode is an activity mode associated with the tennis motion of the user. In the TENNIS mode, processing suitable for the user who is playing tennis is executed.

In the RUN mode, the WALK mode, the BIKE mode, and the Trekking mode, the processing is executed such as specifying the trajectory of movement, the speed of movement, the distance traveled, the user's location information, and the direction at that location of the user who wears the electronic device 1, and displaying such information on the output unit 16. For example, the self-position information is specified based on the positioning satellite signal detected by the GNSS unit 20 and the geomagnetic data detected by the geomagnetic sensor 211. For example, the user's trajectory of movement is specified based on the temporal change in the continuously acquired self-position information. For example, the direction at the user's location is specified based on the geomagnetic data detected by the geomagnetic sensor 211.

The information to be displayed on the output unit 16 may be selected by a user operation. For example, in the RUN mode, a user who is running can display their trajectory of movement, speed of movement, and distance travelled, as well as self-position information and direction, on the output unit 16 through the input unit 15. As described above, the RUN mode, the WALK mode, the BIKE mode, and the Trekking mode are modes that use geomagnetic data detected by the geomagnetic sensor 211. Note that in the present embodiment, the GNSS unit 20 is automatically activated when the usage mode switches to the RUN mode, the WALK mode, the BIKE mode, the Trekking mode, or the like.

On the other hand, in the Treadmill mode, since the user walks or runs on the treadmill, looking in the same direction without changing their position, processing to specify or display a direction is not executed.

The SWIM mode essentially assumes that the user will not check their direction while swimming; therefore, a function to display a direction is not set therein. However, geomagnetic data may be utilized in certain situations, such as swimming long distances in outdoor lakes, seas, etc. In the SWIM mode, the user's trajectory of movement, speed of movement, distance travelled, etc., are typically tracked only when the GNSS unit 20 is in operation.

In the TENNIS mode, although the user is moving their limbs, there is less need to check their trajectory of movement or direction. Therefore, geomagnetic data detected by the geomagnetic sensor 211 is not used in the TENNIS mode according to the present embodiment.

Here, measurement values of the geomagnetism detected by the geomagnetic sensor 211 vary depending on the environmental factors around the electronic device 1, such as magnetization of the parts around the geomagnetic sensor 211. Therefore, in order to acquire accurate geomagnetic data, the geomagnetic sensor 211 needs to be calibrated before use. As mentioned above, the electronic device 1 has various usage modes, such as modes that use geomagnetic data and modes that do not. Therefore, if the geomagnetic sensor 211 is calibrated when geomagnetic data is not expected to be used, the power consumption would unnecessarily increase. The electronic device 1 according to the present embodiment executes the calibration control processing which can suppress the power consumed by calibration of the geomagnetic sensor 211 while maintaining the convenience.

Figures 3, 4:
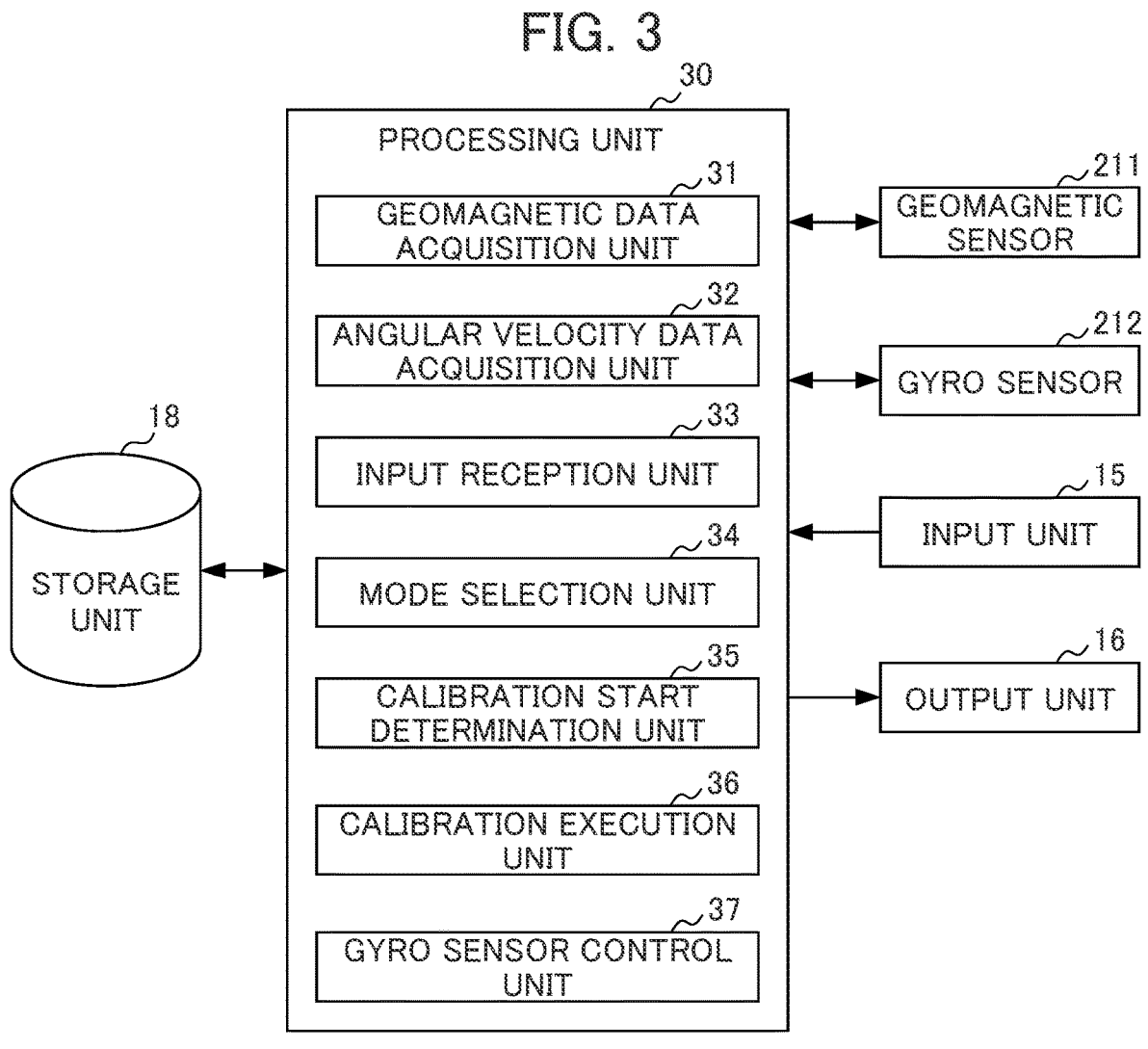
FIG. 3 is a functional block diagram illustrating a functional configuration for executing calibration, which is part of the functional configuration of the electronic device according to an embodiment of the present disclosure.
FIG. 4 is an example of a table stored by the electronic device according to an embodiment of the present disclosure, listing whether geomagnetic data is used and whether calibration is executed in each activity mode in the activity log mode.

Next, the functional configuration for executing the calibration control processing of the electronic device 1 will be described. FIG. 3 is a functional block diagram illustrating the functional configuration for executing the calibration control processing of the electronic device 1.

The processing unit 30, which executes various controls of the electronic device 1, is implemented by the processor 10 that executes arithmetic processing. The processing unit 30 of the present embodiment includes a geomagnetic data acquisition unit 31, an angular velocity data acquisition unit 32, an input reception unit 33, a mode selection unit 34, a calibration start determination unit 35, a calibration execution unit 36, and a gyro sensor control unit 37.

The geomagnetic data acquisition unit 31 executes processing to acquire the geomagnetic data detected and outputted by the geomagnetic sensor 211.

The angular velocity data acquisition unit 32 executes processing to acquire the angular velocity data detected and outputted by the gyro sensor 212.

The input reception unit 33 executes processing to receive an external input through the input unit 15. For example, the input reception unit 33 executes processing to receive information on the usage mode selected by the user operation through the input unit 15.

Based on the information on the usage mode received by the input reception unit 33, the mode selection unit 34 executes processing to switch the usage mode of the electronic device 1 to the usage mode selected by the user operation. That is, the usage mode of the electronic device 1 is selected by the user operation.

The calibration start determination unit 35 executes processing to determine whether the geomagnetic sensor 211 should be calibrated, based on the usage mode of the electronic device 1. For example, when the usage mode is a mode that uses the geomagnetic data detected by the geomagnetic sensor 211, the calibration start determination unit 35 determines to execute calibration.

FIG. 4 is an example of a table stored by the electronic device 1, and this is a table T1 listing whether geomagnetic data is used and whether calibration is executed in each activity mode of the activity log mode. Specifically, FIG. 4 illustrates information indicating whether the processing to display a direction is executed, whether the processing using geomagnetic data is executed other than for displaying a direction, and whether calibration is executed, in each usage mode. The processing using geomagnetic data other than for displaying a direction includes, for example, processing to identify the user's self-position information based on positioning satellite signals and geomagnetic data, processing to display the identified self-position information, processing to identify and display the user's trajectory of movement, speed of movement, etc.

In the present embodiment, the calibration start determination unit 35, for instance, refers to the table T1 stored in the storage unit 18 and determines whether the currently set usage mode of the electronic device 1 specifies calibration or non-calibration of the geomagnetic sensor 211, whereby determining whether calibration should be executed. Alternatively, the calibration start determination unit 35 may refer to the table T1 and determine whether the currently set usage mode of the electronic device 1 is a mode that displays a direction or a mode that uses geomagnetic data other than for displaying a direction, whereby determining whether calibration should be executed (the latter operation of the calibration start determination unit 35 will be described later in the second embodiment). For example, in the RUN mode, since the processing to display a direction is executed, a determination to execute calibration is made. In the SWIM mode, when geomagnetic data is used other than for displaying a direction, a determination to execute calibration is made. Even in the SWIM mode, there might be no use of geomagnetic data depending on the usage of the electronic device 1 to which the present embodiment is applied (the cases of not wearing the device in situations such as long-distance swimming); therefore, in such cases, the setting may be "no use of geomagnetic data, no-calibration". On the other hand, in the TENNIS mode, since a direction is not displayed and geomagnetic data is not used other than for displaying a direction, a determination not to execute calibration is made. FIG. 4 provides items for whether a direction is displayed and whether geomagnetic data is used other than for displaying a direction in each usage mode; however, in the present embodiment, each usage mode needs only be associated with whether calibration is executed. The items indicating whether a direction is displayed and whether geomagnetic data is used other than for displaying a direction will be described later in the second embodiment.

Figures 5, 6:
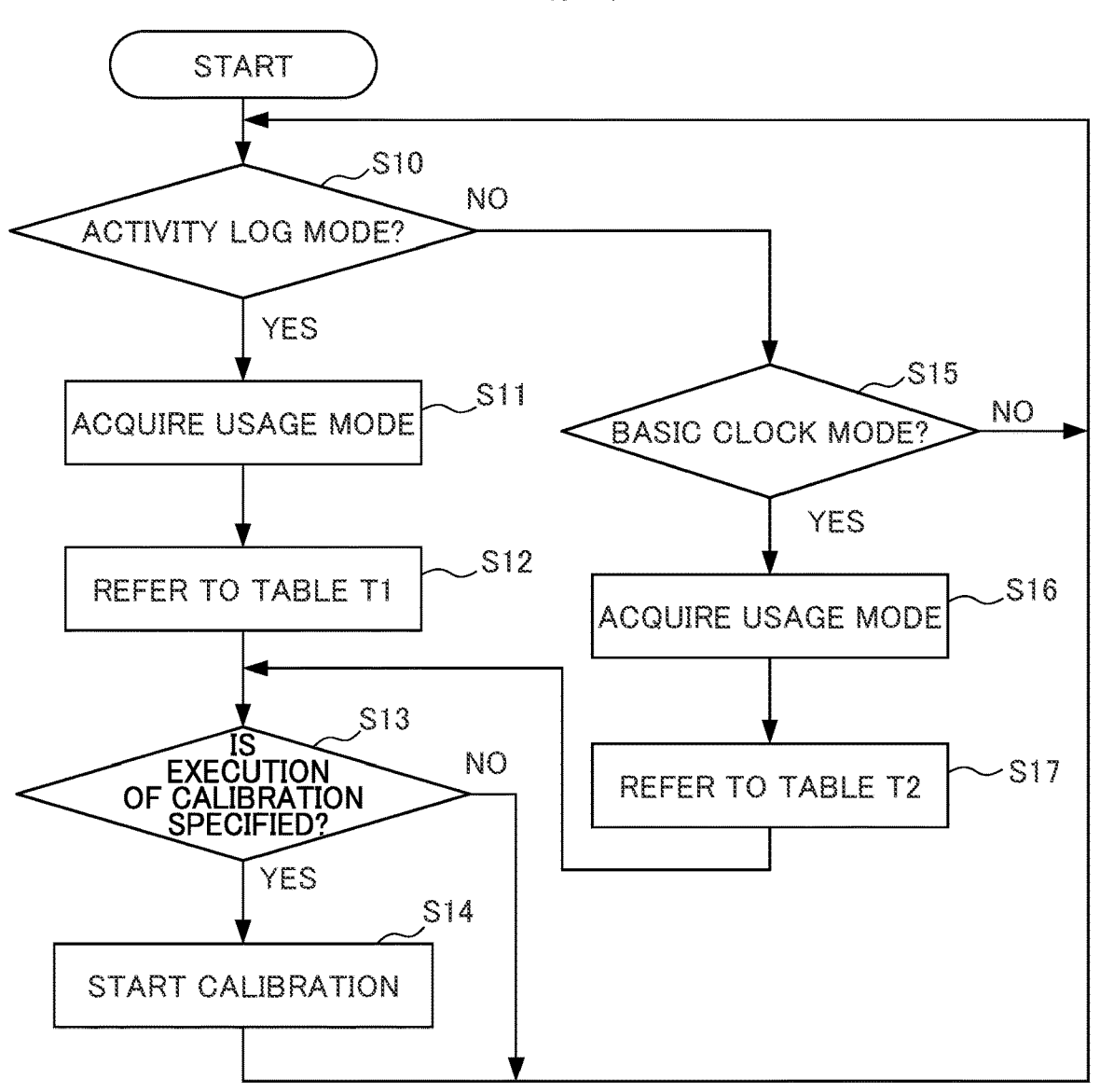
FIG. 5 is an example of a table stored by the electronic device according to an embodiment of the present disclosure, listing whether calibration is executed in each non-activity mode in the basic clock mode.
FIG. 6 is a flowchart illustrating an example of processing to determine whether calibration should be executed, which is part of the calibration control processing executed by the processing unit of the electronic device according to an embodiment of the present disclosure.

In the present embodiment, when the usage mode is the basic clock mode, as in the case of the activity log mode, the calibration start determination unit 35 determines whether the currently set usage mode of the electronic device 1 specifies calibration or non-calibration of the geomagnetic sensor 211, whereby determining whether calibration should be executed. Alternatively, when the usage mode is the basic clock mode and the user selects the direction measurement mode, the calibration start determination unit 35 may determine to execute calibration. The latter operation of the calibration start determination unit 35 will be described later in the second embodiment. FIG. 5 illustrates an example of a table T2, listing whether calibration is executed in each non-activity mode of the basic clock mode. As illustrated in FIG. 5, in the basic clock mode, calibration is executed only when the usage mode is the direction measurement mode. Each usage mode of the basic clock mode is selected by a user input operation through the input unit 15.

The calibration execution unit 36 starts calibration when the calibration start determination unit 35 determines that the geomagnetic sensor 211 should be calibrated. When calibration has started in the activity mode that uses the geomagnetic data detected by the geomagnetic sensor 211, the calibration execution unit 36 may repeat the calibration until the activity mode switches to a different usage mode. The calibration execution unit 36 may be configured to complete the calibration of the geomagnetic sensor 211 before the geomagnetic data is used for any purposes other than calibration in the activity mode. For example, the calibration execution unit 36 may be configured to complete the calibration of the geomagnetic sensor 211 before starting the processing to specify or display a direction or trajectory of movement in the activity mode.

Next, a method of calibrating the geomagnetic sensor 211 is described. In the present embodiment, the geomagnetic sensor 211 is calibrated through either a high-speed calibration using angular velocity data, or a regular calibration without using angular velocity data. In the following description, the high-speed calibration and the regular calibration may simply be referred to as calibration without distinguishing therebetween.

For example, the calibration execution unit 36 may start the high-speed calibration when the calibration start determination unit 35 determines that calibration should be executed in the activity mode, and the calibration execution unit 36 may stop the gyro sensor 212 and execute the regular calibration when the calibration accuracy of the high-speed calibration satisfies a predetermined level of accuracy. The calibration execution unit 36 may start a high-speed calibration when the calibration start determination unit 35 determines that calibration should be executed in the activity mode, and the calibration execution unit 36 may stop the high-speed calibration and execute a regular calibration when a predetermined period of time has elapsed since the calibration start determination unit 35 determined that calibration should be executed. In the present embodiment, a high-speed calibration starts when the calibration start determination unit 35 determines that calibration should be executed, and the high-speed calibration is stopped and a regular calibration is executed when the calibration accuracy of the high-speed calibration satisfies a predetermined level of accuracy, or when a predetermined period of time has elapsed since determining that calibration should be executed even if the accuracy does not satisfy the predetermined level of accuracy. The calibration accuracy in the high-speed calibration may be, for example, the degree of variation of a plurality of origin points. The fewer the variations of the origin points, the higher the calibration accuracy. For example, the predetermined period of time may be 60 seconds, shorter than 60 seconds, or longer than 60 seconds. Note that the predetermined period of time can be changed by a user operation.

The gyro sensor control unit 37 executes start or stop of the gyro sensor 212 in response to an instruction of the calibration execution unit 36. Specifically, the gyro sensor control unit 37 turns on the power of the gyro sensor 212 when a high-speed calibration is executed by the calibration execution unit 36, and turns off the power of the gyro sensor 212 when a regular calibration is executed.

Next, referring to FIGS. 6 and 7, an example of calibration executed by the processing unit 30 of the electronic device 1 in the present embodiment will be described. FIG. 6 is a flowchart illustrating an example of the processing to determine whether calibration should be executed, which is part of the calibration control processing executed by the processing unit 30 of the electronic device 1. For example, when the electronic device 1 is activated, the processing unit 30 executes the calibration control processing.

As illustrated in FIG. 6, in Step S10, the calibration start determination unit 35 of the processing unit 30 determines whether the currently selected usage mode is the activity log mode. If the usage mode of the electronic device 1 is not the activity log mode (NO in Step S10), the calibration start determination unit 35 advances the processing to Step S15. On the other hand, if the usage mode of the electronic device 1 is the activity log mode (YES in Step S10), the calibration start determination unit 35 advances the processing to Step S11. If the calibration start determination unit 35 determines that the usage mode of the electronic device 1 is not the activity log mode (NO in Step S10), the processing advances to Step S15, which will be described later.

In Step S11, the calibration start determination unit 35 acquires the currently selected usage mode. Then, in Step S12, the calibration start determination unit 35 refers to the table T1 regarding the activity log mode, as stored in the storage unit 18. In Step S13, the calibration start determination unit 35 determines whether execution of calibration is specified in the acquired usage mode. If the calibration start determination unit 35 determines that execution of calibration is specified in the currently selected usage mode (YES in Step S13), the processing advances to Step S14, in which the geomagnetic sensor 211 is calibrated, and the processing illustrated in FIG. 6 ends. On the other hand, if the calibration start determination unit 35 determines that execution of calibration is not specified in the currently selected usage mode (NO in Step 313), the processing returns to Step S10.

If the usage mode of the electronic device 1 is determined not to be the activity log mode (NO in Step S10), then in Step S15, the calibration start determination unit 35 of the processing unit 30 determines whether the currently selected usage mode is the basic clock mode. If the calibration start determination unit 35 determines that the usage mode of the electronic device 1 is not the basic clock mode (NO in Step S15), the processing returns to Step S10. On the other hand, if the calibration start determination unit 35 determines that the usage mode of the electronic device 1 is the basic clock mode (YES in Step S15), the processing advances to Step S16.

In Step S16, the calibration start determination unit 35 acquires the currently selected usage mode. Then, in Step S17, the calibration start determination unit 35 refers to the table T2 regarding the basic clock mode, as stored in the storage unit 18. In Step S13, the calibration start determination unit 35 determines whether execution of calibration is specified in the acquired usage mode. If the calibration start determination unit 35 determines that execution of calibration is specified in the currently selected usage mode (YES in Step S13), the processing advances to Step S14, in which the geomagnetic sensor 211 is calibrated, and the processing illustrated in FIG. 6 ends. On the other hand, if the calibration start determination unit 35 determines that the execution of calibration is not specified in the currently selected usage mode (NO in Step S13), the processing returns to Step S10.

Next, referring to FIG. 7, description is provided on the processing executed in the case of determining that calibration of the geomagnetic sensor 211 should be started, as illustrated in FIG. 6. FIG. 7 is a flowchart illustrating an example of the calibration processing executed after determining that calibration should be executed, which is part of the calibration control processing executed by the processing unit 30 of the electronic device 1.

In Step S20, the calibration execution unit 36 of the processing unit 30 determines whether the gyro sensor 212 is activated. If the calibration execution unit 36 determines that the gyro sensor 212 is not activated (NO in Step S20), the processing advances to Step S21. Then, in Step S21, the calibration execution unit 36 instructs the gyro sensor control unit 37 to activate the gyro sensor 212. As a result, the gyro sensor 212 is activated under the control of the gyro sensor control unit 37. On the other hand, if the calibration execution unit 36 determines that the gyro sensor 212 is activated (YES in Step S20), the processing advances to Step S22 by bypassing Step S21.

In Step S22, the calibration execution unit 36 executes a high-speed calibration. At this time, if the correction time counter is not measuring time, the correction time counter starts measuring time.

In Step S23, the calibration execution unit 36 determines whether an abnormal value in geomagnetic data has been detected by the geomagnetic sensor 211 calibrated in Step S22. For example, if the detected geomagnetic data exceeds a predetermined threshold, the calibration execution unit 36 determines that an abnormal value in geomagnetic data has been detected. If the calibration execution unit 36 determines that an abnormal value in geomagnetic data has been detected (YES in Step S23), the processing advances to Step S24. Then, in Step S24, the calibration execution unit 36 resets the correction time counter to zero and returns the processing to Step S21. This allows a high-speed calibration to be executed again. On the other hand, if the calibration execution unit 36 determines that an abnormal value in geomagnetic data has not been detected by the geomagnetic sensor 211 calibrated in Step S22 (NO in Step S23), the processing advances to Step S25.

In Step S25, the calibration execution unit 36 determines whether the calibration accuracy of the geomagnetic sensor 211 satisfies a predetermined level of accuracy. For example, the calibration execution unit 36 may determine calibration accuracy, based on the degree of variation of a plurality of origins identified during calibration. If the calibration execution unit 36 determines that the calibration accuracy of the geomagnetic sensor 211 does not satisfy the predetermined level of accuracy (YES in Step S25), the processing advances to Step S26. Then, in Step S26, the calibration execution unit 36 determines whether a predetermined period of time has elapsed since starting the calibration in Step S22. If the calibration execution unit 36 determines that the predetermined period of time has elapsed (YES in Step S26), the processing advances to Step S27; and if the calibration execution unit 36 determines that the predetermined period of time has not elapsed (NO in Step S26), the processing returns to Step S22. On the other hand, if the calibration execution unit 36 determines that the calibration accuracy of the geomagnetic sensor 211 satisfies the predetermined level of accuracy (NO in Step S25), the processing advances to Step S27 by bypassing Step S26.

In Step S27, the calibration execution unit 36 instructs the gyro sensor control unit 37 to stop the gyro sensor 212. As a result, the gyro sensor 212 stops under the control of the gyro sensor control unit 37.

In Step S28, the calibration execution unit 36 executes a normal calibration.

In Step S29, the calibration execution unit 36 determines whether an abnormal value in geomagnetic data has been detected by the geomagnetic sensor 211 calibrated in Step S28. If the calibration execution unit 36 determines that an abnormal value in geomagnetic data has not been detected (NO in Step S29), the processing returns to Step S28. On the other hand, if the calibration execution unit 36 determines that an abnormal value in geomagnetic data has been detected (YES in Step S29), the processing advances to Step S30. Then, in Step S30, the calibration execution unit 36 resets the correction time counter to 0 and returns the processing to Step 321. This allows the geomagnetic sensor 211 to be calibrated using angular velocity data again. The calibration execution unit 36 repeats the calibration processing as illustrated in FIG. 7, until completing the usage mode, in which the calibration start determination unit 35 has determined to calibrate the geomagnetic sensor 211.

Second Embodiment

Next, a second embodiment of the present disclosure will be described. The second embodiment differs from the first embodiment in the processing executed by the calibration start determination unit 35 that determines whether the geomagnetic sensor 211 should be calibrated, based on the usage mode of the electronic device 1. Referring to FIG. 8, the processing corresponding to the processing illustrated in FIG. 6 of the first embodiment will be described, and the description of other identical components and processing will be omitted. FIG. 8 is a flowchart illustrating an example of the processing to determine whether calibration should be executed, which is part of the calibration control processing executed by the processing unit 30 of the electronic device 1, in the second embodiment.

As illustrated in FIG. 8, in Step S40, the calibration start determination unit 35 of the processing unit 30 determines whether the currently selected usage mode is the activity log mode. If the calibration start determination unit 35 determines that the usage mode of the electronic device 1 is not activity log mode (NO in Step S40), the processing advances to Step S44. On the other hand, if the calibration start determination unit 35 determines that the usage mode of the electronic device 1 is the activity log mode (YES in Step S40), the processing advances to Step S41.

In Step S41, the calibration start determination unit 35 determines whether the processing to display a direction should be executed in the currently selected activity mode. For example, the calibration start determination unit 35 refers to the table T1 listing whether the processing to display a direction should be executed in each activity mode as stored in the storage unit 18, and determines whether the processing to display a direction should be executed in the currently selected activity mode. If the calibration start determination unit 35 determines that the processing to display a direction should be executed in the currently selected activity mode (YES in Step S41), the processing advances to Step S43. On the other hand, if the calibration start determination unit 35 determines that the processing to display a direction should not be executed in the currently selected activity mode (NO in Step S41), the processing advances to Step S42.

In Step S42, the calibration start determination unit 35 determines whether geomagnetic data is used other than for the processing to display a direction. If the calibration start determination unit 35 determines that geomagnetic data is used (YES in Step S42), the processing advances to Step S43. On the other hand, if the calibration start determination unit 35 determines that geomagnetic data is not used (NO in Step S42), the processing returns to Step S40.

If the current usage mode is determined not to be the activity log mode in Step S40, then in Step 44, the calibration start determination unit 35 determines whether the current usage mode of the electronic device 1 is the basic clock mode. If the calibration start determination unit 35 determines that the usage mode is the basic clock mode (YES in Step S44), the processing advances to Step S45. On the other hand, if the calibration start determination unit 35 determines that the usage mode is not the basic clock mode (NO in Step S44), the processing returns to Step S40. At this time, the usage mode of the electronic device 1 is set to a mode other than the basic clock mode or activity log mode. For example, the usage mode of the electronic device 1 may be set to a communication mode for external communication.

In Step S45, the calibration start determination unit 35 determines whether the current non-activity mode of the electronic device 1 is the direction measurement mode. If the calibration start determination unit 35 determines that the non-activity mode is the direction measurement mode (YES in Step S45), the processing advances to Step S43. On the other hand, if the calibration start determination unit 35 determines that the non-activity mode is not the direction measurement mode (NO in Step S45), the processing returns to Step S40.

In Step S43, the calibration execution unit 36 starts calibration of the geomagnetic sensor 211.

As described above, the electronic device 1 according to the above embodiments is an electronic device including the geomagnetic sensor 211 that detects geomagnetic data, in which the electronic device 1 operable in a plurality of types of usage modes including an activity mode associated with a predetermined activity, includes: a geomagnetic sensor 211 that detects geomagnetic data; one or more processors; and one or more memories storing a program to be executed by the one or more processors. The program causes the one or more processors to perform the following: starting calibration of the geomagnetic sensor 211 when it is determined that the electronic device 1 is operating in the usage mode of the activity mode associated with the predetermined activity.

As a result, when calibration is executed by activating the geomagnetic sensor, the electronic device 1 according to the above embodiments does not need to acquire information such as the time elapsed since the previous calibration, the duration of the walking motion or the like other than information on the usage mode as conditions for determination; therefore, the electronic device 1 can simplify the processing to start calibration of the geomagnetic sensor.

The usage mode includes a plurality of types of activity modes associated with a plurality of types of activities, in which each of the plurality of types of activities is at least associated with information indicating whether a direction is displayed in each activity mode. The processing unit 30 may start calibration when the activity mode is an activity mode associated with the information indicating that a direction is displayed.

This enables calibration of the geomagnetic sensor 211 to start when the activity mode is associated with the information indicating that a direction is displayed; therefore, a direction can be displayed using more accurate geomagnetic data thus calibrated.

The usage mode includes a plurality of types of activity modes associated with a plurality of types of activities, in which each of the plurality of types of activity modes is at least associated with information indicating whether geomagnetic data is used other than for displaying a direction in each activity mode. The processing unit 30 may start calibration when the activity mode is an activity mode associated with the information indicating that geomagnetic data is used other than for displaying a direction.

This enables calibration of the geomagnetic sensor 211 to start when the activity mode is associated with information indicating that geomagnetic data is used other than for displaying a direction; therefore, more accurate geomagnetic data thus calibrated can be used, improving the convenience.

The usage mode includes a specific non-activity mode that is not associated with a specific activity. The processing unit 30 may start calibration when the specific non-activity mode is determined to be a direction measurement mode.

This enables calibration of the geomagnetic sensor 211 to start when the specific non-activity mode is determined to be a direction measurement mode; therefore, a direction can be measured using more accurate geomagnetic data thus calibrated.

The processing unit 30 may not start calibration when the usage mode is determined to be an activity mode that is not associated with the specific activity.

This allows calibration not to be executed when the usage mode is an activity mode that is not associated with the specific activity; therefore, the power consumption can be more reliably reduced.

The electronic device 1 according to the above embodiments is an electronic device including the geomagnetic sensor 211 that detects geomagnetic data, in which the electronic device 1 operable in a plurality of types of usage modes, includes: a geomagnetic sensor 211 that detects geomagnetic data, one or more processors; and one or more memories storing a program to be executed by the one or more processors. The program causes the one or more processors to perform the following: starting calibration of the geomagnetic sensor 211 when it is determined that the electronic device 1 is operating in a mode among the plurality of types of usage modes that uses the geomagnetic data detected by the geomagnetic sensor 211.

This allows for automatically determining whether calibration should be executed based on the usage of the electronic device 1; therefore, the power consumed by calibration can be more effectively controlled, while maintaining the high convenience of the electronic device 1.

The processing unit 30 may not execute calibration when any one of the plurality of types of usage modes set in the electronic device 1 is a mode that does not use the geomagnetic data detected by the geomagnetic sensor 211.

This allows the power consumption to be more reliably reduced in a mode that does not use geomagnetic data, since calibration is not executed.

The processing unit 30 may start calibration when a direction is determined to be displayed in any one of the plurality of types of usage modes set in the electronic device 1.

This enables a direction to be displayed based on the geomagnetic data detected by the geomagnetic sensor 211 thus calibrated.

The processing unit 30 may start calibration when geomagnetic data is determined to be used other than for displaying a direction in any one of the plurality of types of usage modes set in the electronic device 1.

This enables calibration of the geomagnetic sensor 211 to start when the geomagnetic data is determined to be used other than for displaying a direction; therefore, more accurate geomagnetic data thus calibrated can be used, improving the convenience.

The usage mode includes a specific activity mode associated with a specific activity, and the processing unit 30 may start calibration when a direction is determined to be displayed in the specific activity mode.

This enables a direction to be displayed based on the geomagnetic data detected by the geomagnetic sensor 211 thus calibrated.

The usage mode includes a specific activity mode associated with a specific activity, and the processing unit 30 may start calibration when the geomagnetic data is determined to be used other than for displaying a direction in the specific activity mode.

This enables calibration of the geomagnetic sensor 211 to start when the geomagnetic data is determined to be used other than for displaying a direction in the specific activity mode; therefore, more accurate geomagnetic data thus calibrated can be used, improving the convenience.

The usage mode may include a specific non-activity mode that is not associated with a specific activity, and the processing unit 30 may start calibration when the specific non-activity mode is determined to be the direction measurement mode.

This allows calibration of the geomagnetic sensor 211 to start when the specific non-activity mode is determined to be the direction measurement mode; therefore, a direction can be measured using more accurate geomagnetic data thus calibrated.

The usage mode may be selected by a user operation.

This reliably ensures selection of a usage mode in alignment with the user's intent.

In the activity mode that uses the geomagnetic data detected by the geomagnetic sensor, a direction may be displayed optionally based on the geomagnetic data detected by the geomagnetic sensor 211.

This enables a direction to be displayed based on the geomagnetic data detected by the geomagnetic sensor 211 thus calibrated.

In the activity mode that uses the geomagnetic data detected by the geomagnetic sensor 211, the geomagnetic data detected by the geomagnetic sensor 211 may be used without displaying a direction.

This enables various information to be provided based on highly accurate geomagnetic data detected by the geomagnetic sensor 211 thus calibrated.

In the activity mode that uses the geomagnetic data detected by the geomagnetic sensor 211, calibration may be completed before the geomagnetic data detected by the geomagnetic sensor 211 is used in the aspect of using the activity mode.

This enables the services using the geomagnetic data detected by the geomagnetic sensor 211 thus detected to be more reliably delivered to the user.

When calibration has started in the activity mode that uses the geomagnetic data detected by the geomagnetic sensor 211, the processing unit 30 may repeat the calibration until the activity mode switches to another usage mode.

This enables calibration of the geomagnetic sensor 211 to be repeated in the activity mode; therefore, even when the user is moving and the magnetic field environment around the user is changing, the services can be continuously provided using highly accurate geomagnetic data.

The electronic device 1 further includes the gyro sensor 212 that detects angular velocity data, and when the processing unit 30 determines to execute calibration, calibration is started using the angular velocity data detected by the gyro sensor 212. Calibration may be executed without using the angular velocity data when the calibration accuracy using the angular velocity data satisfies a predetermined level of accuracy, or if the calibration accuracy using the angular velocity data does not satisfy a predetermined level of accuracy and a predetermined period of time has elapsed since determining to execute calibration.

In this manner, the gyro sensor 212 is initially used for executing faster and more accurate calibration, and when the calibration at a predetermined degree of accuracy has been executed or a predetermined period of time has elapsed, calibration is executed without using the gyro sensor 212. Therefore, calibration of the geomagnetic sensor 211 can be executed more reliably while suppressing the power consumption.

Note that the present disclosure is not limited to the above-described embodiments, and modifications and improvements within the range capable of achieving the objectives of the present disclosure are included in the present disclosure.

The processing sequence described above can be executed by hardware, and can also be executed by software. In other words, the functional configuration of FIG. 3 is merely an illustrative example, and the present invention is not particularly limited thereto. More specifically, the types of functional blocks employed to realize the above-described functions are not particularly limited to the examples shown in FIG. 3, so long as the electronic device 1 can be provided with the functions enabling the aforementioned processing sequence to be executed in its entirety.

In addition, a single functional block may be configured by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium distributed separately from the device main body for supplying the program to a user, but also can be constituted by a storage medium or the like supplied to the user in a state incorporated in the device main body in advance. The removable medium is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, a hard disk included in the storage unit 18 of FIG. 3 in which the program is recorded.

It should be noted that, in the present specification, the steps defining the program recorded in the storage medium include not only the processing executed in a time series following this order, but also processing executed in parallel or individually, which is not necessarily executed in a time series.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-151494, filed Sep. 22, 2022 which is hereby incorporated by reference wherein in its entirety.

What is claimed is:

1. An electronic device operable in a plurality of types of usage modes including an activity mode associated with a predetermined activity, the device comprising:

a geomagnetic sensor that detects geomagnetic data;

one or more processors; and one or more memories storing a program to be executed by the one or more processors;

wherein the program causes the one or more processors to perform the following:

starting calibration of the geomagnetic sensor when it is determined that the electronic device is operating in the usage mode of the activity mode associated with the predetermined activity.

2. The electronic device according to claim 1, wherein the usage mode includes a plurality of types of activity modes associated with a plurality of types of activities, wherein each of the plurality of types of activity modes is at least associated with information indicating whether a direction is displayed in each activity mode, and wherein the one or more processors start the calibration when the activity mode is an activity mode associated with information indicating that a direction is displayed.

3. The electronic device according to claim 1, wherein the usage mode includes a plurality of types of activity modes associated with a plurality of types of activities, wherein each of the plurality of types of activity modes is at least associated with information indicating whether geomagnetic data is used other than for displaying a direction in each activity mode, and wherein the one or more processors start the calibration when the activity mode is an activity mode associated with information indicating that geomagnetic data is used other than for displaying a direction.

4. The electronic device according to claim 1, wherein the usage mode includes a non-activity mode that is not associated with the predetermined activity, and wherein the one or more processors start the calibration when the predetermined non-activity mode is determined to be a direction measurement mode.

5. The electronic device according to claim 1,
wherein the one or more processors do not start the calibration when the usage mode is determined to be an activity mode that is not associated with the predetermined activity.

6. An electronic device operable in a plurality of types of usage modes, the device comprising:
a geomagnetic sensor that detects geomagnetic data,
one or more processors; and
one or more memories storing a program to be executed by the one or more processors;
wherein the program causes the one or more processors to perform the following:
starting calibration of the geomagnetic sensor when it is determined that the electronic device is operating in a mode among the plurality of types of usage modes that uses the geomagnetic data detected by the geomagnetic sensor.

7. The electronic device according to claim 6,
wherein the one or more processors do not execute the calibration when any one of the plurality of types of usage modes set in the electronic device is a mode that does not use the geomagnetic data detected by the geomagnetic sensor.

8. The electronic device according to claim 6,
wherein the one or more processors start the calibration when a direction is determined to be displayed in any one of the plurality of types of usage modes set in the electronic device.

9. The electronic device according to claim 6,
wherein the one or more processors start the calibration when geomagnetic data is determined to be used other than for displaying a direction in any one of the plurality of types of usage modes set in the electronic device.

10. The electronic device according to claim 6,
wherein the usage mode includes an activity mode associated with a predetermined activity, and
wherein the one or more processors start the calibration when a direction is determined to be displayed in the activity mode associated with the predetermined activity.

11. The electronic device according to claim 6,
wherein the usage mode includes an activity mode associated with a predetermined activity, and
wherein the one or more processors start the calibration when geomagnetic data is determined to be used other than for displaying a direction in the activity mode associated with the predetermined activity.

12. The electronic device according to claim 6,
wherein the usage mode includes a non-activity mode that is not associated with a predetermined activity, and
wherein the one or more processors start the calibration when the non-activity mode that is not associated with the predetermined activity is determined to be a direction measurement mode.

13. The electronic device according to claim 6,
wherein the usage mode is selected by a user operation.

14. The electronic device according to claim 1,
wherein a direction is displayed optionally based on the geomagnetic data detected by the geomagnetic sensor, in the activity mode that uses the geomagnetic data detected by the geomagnetic sensor.

15. The electronic device according to claim 1,
wherein the geomagnetic data detected by the geomagnetic sensor is used without displaying a direction in the activity mode that uses the geomagnetic data detected by the geomagnetic sensor.

16. The electronic device according to claim 1,
wherein, in the activity mode that uses the geomagnetic data detected by the geomagnetic sensor, the calibration is completed before the geomagnetic data detected by the geomagnetic sensor is used in an aspect of using the activity mode.

17. The electronic device according to claim 1,
wherein, when the calibration has started in the activity mode that uses the geomagnetic data detected by the geomagnetic sensor, the one or more processors repeat the calibration until the activity mode switches to a different usage mode.

18. The electronic device according to claim 1, the device further comprising:
a gyro sensor that detects angular velocity data,
wherein, when the calibration is determined to be executed, the one or more processors start the calibration using the angular velocity data detected by the gyro sensor, and in a case where calibration accuracy of the calibration using the angular velocity data satisfies a predetermined level of accuracy, or in a case where the calibration accuracy of the calibration using the angular velocity data does not satisfy the predetermined level of accuracy and a predetermined period of time has elapsed since execution of the calibration was determined, the one or more processors execute the calibration without using the angular velocity data.

19. A calibration method executed by an electronic device,
the electronic device operable in a plurality of types of usage modes including an activity mode associated with a predetermined activity and including a geomagnetic sensor that detects geomagnetic data,
the method comprising:
starting calibration of the geomagnetic sensor when it is determined that the electronic device is operating in the usage mode of the activity mode associated with the predetermined activity.

20. A non-transitory computer-readable storage medium storing a program executable by one or more processors in an electronic device,
the electronic device operable in a plurality of types of usage modes including an activity mode associated with a predetermined activity and including a geomagnetic sensor that detects geomagnetic data,
the program causing the one or more processors to execute:
starting calibration of the geomagnetic sensor when it is determined that the electronic device is operating in the usage mode of the activity mode associated with the predetermined activity.

21. A calibration method executed by an electronic device, the electronic device operable in a plurality of types of usage modes,
the device comprising a geomagnetic sensor that detects geomagnetic data, the method comprising:
starting calibration of the geomagnetic sensor when it is determined that the electronic device is operating in a mode among the plurality of types of usage modes that uses the geomagnetic data detected by the geomagnetic sensor.

22. A non-transitory computer-readable storage medium storing a program executable by one or more processors in an electronic device, the electronic device operable in a plurality of types of usage modes, the electronic device comprising a geomagnetic sensor that detects geomagnetic data, the program causing the one or more processors to execute:

starting calibration of the geomagnetic sensor when it is determined that the electronic device is operating in a mode among the plurality of types of usage modes that uses the geomagnetic data detected by the geomagnetic sensor.

\* \* \* \* \*